Figure 1:
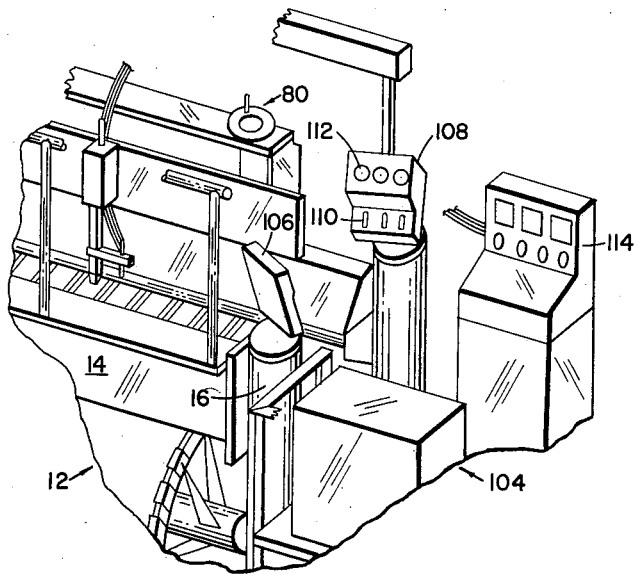

May 1, 1962   M. F. NESMITH   3,032,639
WELDING APPARATUS
Filed April 13, 1959   3 Sheets-Sheet 1

Malcolm F. Nesmith,
INVENTOR.

BY

ATTORNEYS.

May 1, 1962 M. F. NESMITH 3,032,639
WELDING APPARATUS
Filed April 13, 1959 3 Sheets-Sheet 2

Malcolm F. Nesmith,
INVENTOR.

BY
ATTORNEYS.

May 1, 1962 M. F. NESMITH 3,032,639
WELDING APPARATUS

Filed April 13, 1959 3 Sheets-Sheet 3

Malcolm F. Nesmith,
INVENTOR.

BY
ATTORNEYS.

United States Patent Office 3,032,639
Patented May 1, 1962

3,032,639
WELDING APPARATUS
Malcolm F. Nesmith, 904 7th Ave. SE., Decatur, Ala.
Filed Apr. 13, 1959, Ser. No. 806,192
2 Claims. (Cl. 219—125)
(Granted under Title 35, U.S. Code (1952), sec. 266)

The invention described herein may be manufactured and used by or for the Government for governmental purposes without the payment of any royalty thereon.

My invention relates to apparatus for joining sheets of material in butt relation along a line and more particularly to such apparatus for butt welding thin sheets of metal.

Conventional apparatus is adequate for joining relatively thick sheets of material since the weight thereof retains the plates in contact with an anvil of the apparatus and the heat of the joining machines is sufficiently dissipated by the sheets for maintenance thereof in the desired original shape. When thin sheets of material are joined in the conventional apparatus the heat of the joining causes the material of the sheets adjacent the connection line to buckle and distort the product of the operation. An apparatus for joining thin sheets of material will join thick sheets thereof equally well.

It is therefore an object of my invention, to provide an apparatus for joining sheets of material disposed in butt relation along a connection line.

Another object of my invention is to provide such apparatus disposed for joining such plates having variable thicknesses.

A further object of my invention is to provide such apparatus with a clamp including a pressure device to secure the sheets to the anvil during the joining operation.

A still further object of my invention is to provide such clamps disposed for substantially continuous engagement with the portions of the sheets adjacent the connection.

An additional object of my invention is to provide such apparatus having individual devices to locate the clamps and control the pressure thereof.

An added object of my invention is to provide such apparatus disposed to join a pair of such plates formed in inclosure relation.

Other aims and objects of my invention will appear from the following specification.

In carrying out my invention, a frame slidably disposed on a pair of pillars is provided with a pair of longitudinal supports, an anvil spaced therefrom and disposed in parallel relation thereto to support a pair of sheets in butt relation along a reference line coincident with a linear joint therebetween, and a plate having a longitudinal edge coextensive with the line and parallel thereto. A machine for joining the sets is disposed on the edge for operation therealong.

The anvil is cantilever-supported in the frame for access to the apparatus of sheets formed to constitute an enclosure, and a latch is provided to secure the open end of the anvil to the frame for the joining operation. A device is disposed on the latch for adjustment of the anvil to parallel relation with the edge.

The apparatus is provided with a pair of clamps having respective sets of arms pivoted on the frame, and pressure-operated devices for rotating the arms to secure the sheets to the anvil, and for locating the arms with respect to the connection line. The pressure-operated devices are also disposed to release the pressures on the respective sheets.

Figure 2:
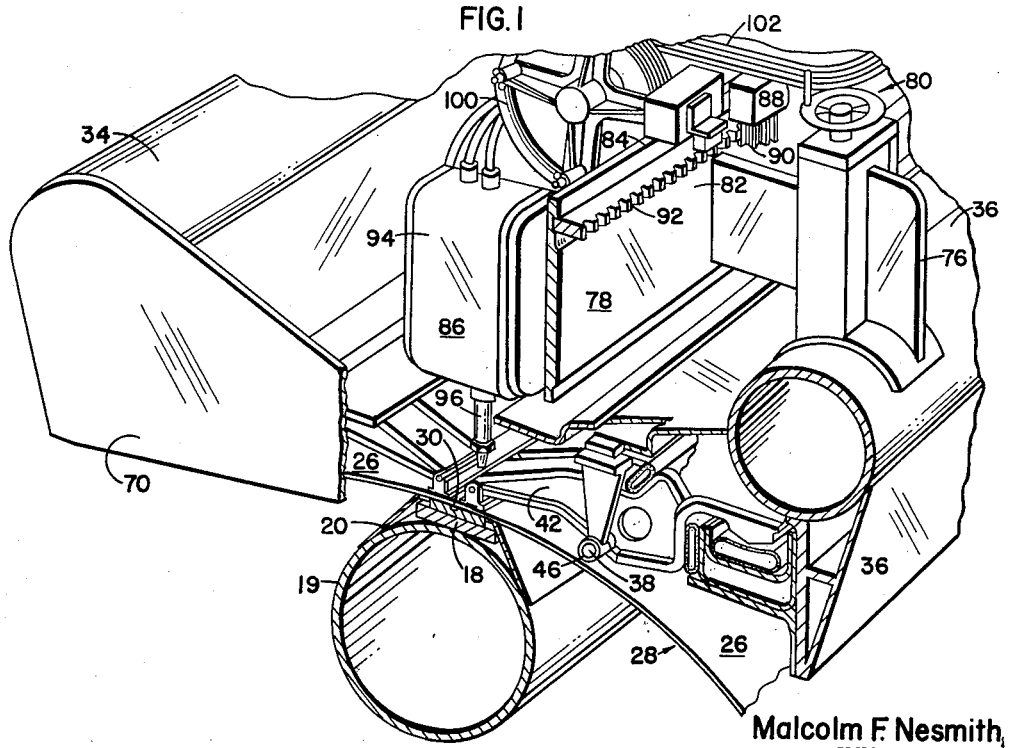
Figure 3:
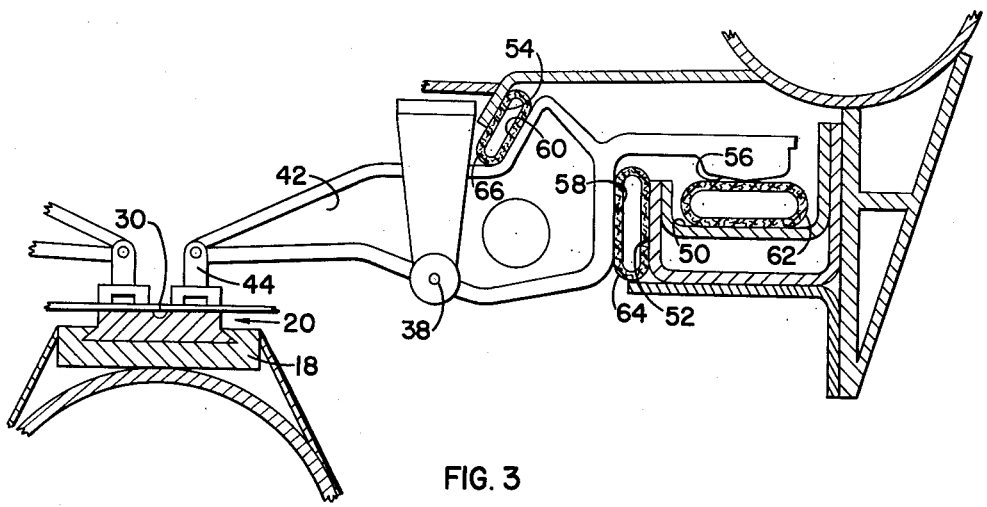
Figure 6:
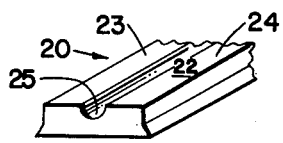
Figure 5:
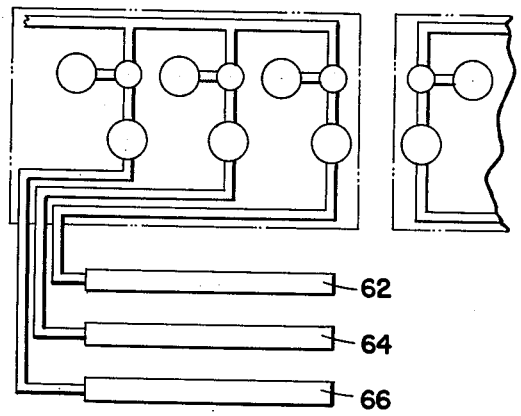
Figure 4:
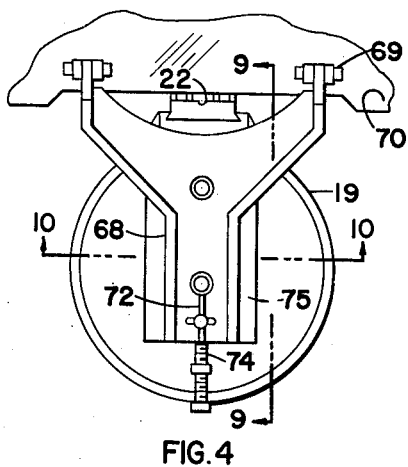
Figure 9:
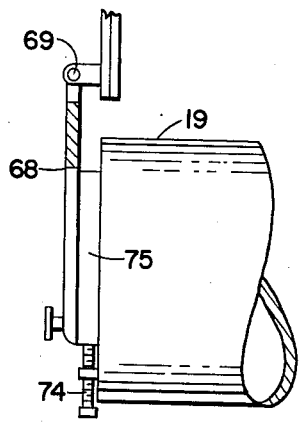
Figure 10:
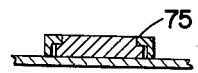
Figure 8:
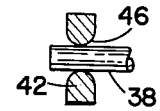
Figure 7:
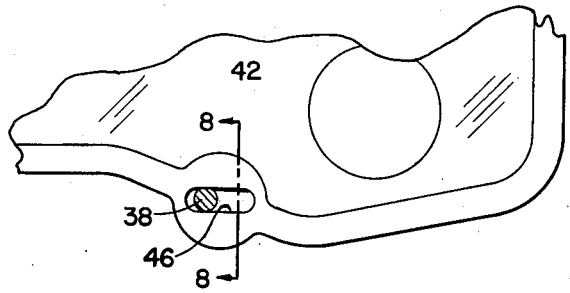

For more complete understanding, reference is directed to the following description and the accompanying drawings, in which:

FIGURE 1 is a partial perspective view of the closed end of a welding apparatus embodying my invention with cylindrically formed plates shown therein for joining;
FIGURE 2 is a perspective view of the open end of the apparatus;
FIGURE 3 is an enlarged view of the anvil and arms;
FIGURE 4 is an elevation of the yoke;
FIGURE 5 is a schematic view of the tube mechanism;
FIGURE 6 is an enlarged elevation of a backup bar;
FIGURE 7 is an enlarged view of one of the arms;
FIGURE 8 is a view along line 8—8 of FIGURE 7;
FIGURE 9 is a view 2 along line 9—9 of FIGURE 4; and
FIGURE 10 is a view along line 10—10 of FIGURE 4.

Accordingly, an apparatus 12 for butt welding a pair of metallic sheets 28 is provided with a frame 14 slidably supported on a pair of substantially vertical pillars 16.

Frame 14 includes substantially horizontal supports 34 and 36 and an anvil 18 disposed on a tubular cantilever support 19 for engagement with selective backup bars 20.

Each of the bars includes a face 22 including segments 23 and 24 separated by a groove 25 for respective engagement of the segments with the contiguous portions 26 of sheets 28 disposed for butt connection along a line 30. Grooves 25 of the respective bars vary in widths and depths in accordance with the material of the sheets and the thickness thereof.

Supports 34, 36, and a pair of rods 38 of frame 14 are secured in substantial parallel relation. Inwardly extending arms 42 respectively provided with shoes 44 pivoted on corresponding ends thereof are disposed in sets with intermediate holes 46 of the arms enclosing the respective rods for pivoted engagement therewith to form a pair of clamps corresponding to the rods for adjacent engagement of the shoes of the arms with the contiguous portions 26 for substantially continuous engagement of the sheets along the joint.

Supports 34 and 36 are respectively provided with substantially horizontal, vertical, and angled surfaces 50, 52, and 54 and arms 42 include corresponding surfaces 56, 58, and 60.

Holes 46 are elongated substantially horizontally and, resilient tubes 62, 64 and 66 are respectively disposed between the corresponding surfaces, with tubes 64 inflatable for respective movement of shoes 44 towards line 30. Tubes 62 are inflatable respectively to rotate arms 42 and increase pressure on the contiguous portions and the surfaces within holes 46 are convex as in FIGURE 7 to facilitate seating of the shoes on the contiguous portions. Tubes 66 are inflatable to oppose the tubes 62 and 64 corresponding thereto.

The contiguous portions 26 of a pair of sheets 28 curved to form an enclosure are inserted in apparatus 12 through the open end thereof and placed upon bar 20 with line 30 disposed over substantially the center of groove 25.

A latch 68 pivoted at 69 on a yoke 70 connecting the open ends of supports 34 and 36 is rotated into engagement with support 19 and the latch includes screw mechanisms 72 and 74 for normally disposed adjustments of face 22 to substantial parallel relation with the longitudinal supports.

A vertical column 76 is secured to support 36 and a member 78 is adjusted in slidable relation with column 76 by a manually operated mechanism 80.

Member 78 includes a plate 82 provided with an edge 84, disposed in parallel relation with support 36, and a conventional welding machine 86 includes rollers (not shown) for respective engagement with plate 82 and edge 84.

A motor 88 of machine 86 includes a gear 90 to engage a rack 92 of plate 82 for progress of the machine along edge 84.

Machine 86 includes a head 94 with an electrode 96, a mechanism, (not shown) for manual positioning of the electrode in a horizontal direction normal to support 36, a reel 100 for welding wire, and a device (not shown) for feeding the welding wire to the contact point of the electrode. Electrode 96 is connected in a circuit (not shown) by wires 102.

Platform 104 includes pressure control boards 106 and 108, with valves 110 and gauges 112 for respectively controlling inflation of the tubes and indicating the pressures therein.

A console 114 disposed on platform 104 includes an electrical control panel with switches and meters for control of the arc voltage, arc current, wire feed, and travel speed. Water for torch cooling and gas for arc shielding are controlled automatically while an instrumentation system (not shown) provides a continuous graphic record of voltage, amperage and wire feed.

In operation, the sheets are quickly and easily disposed in apparatus 12 with the line of butt connection in position over backup bar groove 25 and the position of the sheets is maintained by means of the horizontal tubes.

Groove 25 permits penetration of the weld between the sheets and limits the size of weld bead formed therebetween. The mass of the backup bar and anvil provides rapid heat dissipation and resilience of tubes 62 permits the shoes to ride on the sheets. As welding head 94 proceeds along line 30 to weld the butt connection, the metal of the sheets expands and contracts, and the pairs of shoes operate successively, responsive to the pressure of tubes 62 on the opposite ends of corresponding arms 42, to retain the sheets in contact with segments 23 and 24 along the weld and minimize residual stresses in the sheets.

While the foregoing is a description of the preferred embodiment, the following claims are intended to include those modifications and variations that are within the spirit and scope of my invention.

I claim:
1. Apparatus to secure a pair of metal sheets for welding a linear butt joint therebetween, comprising: a frame with a pneumatic pressure source and a pair of substantially horizontal rods disposed in parallel relation; an anvil for supporting the sheets disposed in cantilever relation with the frame; a device pivoted to said frame and disposed for adjustable engagement with the free end of said anvil for symmetrical arrangement of the joint and said rods; sets of clamps respectively provided with holes disposed for enclosure of said rods for respective arrangement of said clamp sets along said rod, and elongated for substantially horizontal displacement of said sets; and pairs of tubes disposed in communication with said pressure source for selective inflation, with the tubes of the pairs respectively disposed between said frame and said clamp sets, including a first pair disposed for rotation of the sets to resiliently secure the sheets to said anvil, a second pair disposed for the horizontal displacement of said sets towards the joint, and a third pair angularly disposed to oppose the operation of said first and second tube pairs for opposite rotation and horizontal displacement of said sets away from the joint; said clamps disposed for substantially continuous engagement with the sheets along the joint.

2. Apparatus as in claim 1 with a plurality of backup bars disposed for selective engagement with said anvil and respectively provided with surfaces for the plate engagement; said surfaces including portions separated by grooves disposed for adjacent relation to the connection line; and said grooves having widths and depths corresponding to the material of the sheets and the thickness thereof.

References Cited in the file of this patent
UNITED STATES PATENTS

| | | |
|---|---|---|
| 720,256 | Kleinschmidt | Feb. 10, 1903 |
| 1,546,250 | Phillips | July 14, 1925 |
| 1,851,563 | Chapman | Mar. 29, 1932 |
| 2,288,032 | Smith | June 30, 1942 |
| 2,403,221 | Howard | July 2, 1946 |
| 2,724,036 | Hess | Nov. 15, 1955 |
| 2,866,077 | Morton et al. | Dec. 23, 1958 |
| 2,922,870 | Collins et al. | Jan. 26, 1960 |